United States Patent [19]
Juhl et al.

[11] Patent Number: 5,047,253
[45] Date of Patent: Sep. 10, 1991

[54] MULTILAYER FILM TUBE FOR COOK-IN MEAT ADHESION AND METHOD OF MAKING

[75] Inventors: Roger L. Juhl, Countryside; Jeffrey M. Schuetz, Woodridge, both of Ill.

[73] Assignee: Viskase Corporation, Chicago, Ill.

[21] Appl. No.: 489,393

[22] Filed: Mar. 5, 1990

Related U.S. Application Data

[63] Continuation-in-part of Ser. No. 252,409, Oct. 3, 1988, Pat. No. 4,915,963, which is a continuation of Ser. No. 126,336, Nov. 30, 1987, Pat. No. 4,784,863.

[51] Int. Cl.$^5$ .................. A22C 13/00; B65B 55/00
[52] U.S. Cl. ................... 426/113; 426/127; 426/129; 426/412; 426/415; 428/518; 428/34.8; 428/35.4; 138/118.1
[58] Field of Search ............ 426/129, 127, 113, 412, 426/415; 428/35, 518

[56] References Cited

U.S. PATENT DOCUMENTS

| | | | |
|---|---|---|---|
| 2,346,417 | 5/1941 | Cornwell | 426/35 |
| 3,881,023 | 4/1975 | Wilson | 426/132 |
| 4,104,404 | 8/1978 | Bieler et al. | 428/35 |
| 4,396,039 | 8/1983 | Klenk et al. | 426/135 |
| 4,463,778 | 8/1984 | Judd et al. | 428/508 |
| 4,469,742 | 9/1984 | Oberle et al. | 428/215 |
| 4,592,795 | 6/1986 | Bridgeford | 426/105 |
| 4,606,922 | 8/1986 | Schirmer | 426/412 |
| 4,784,863 | 11/1988 | Lustig et al. | 426/415 |
| 4,888,223 | 12/1989 | Sugimoto et al. | 426/129 |
| 4,915,963 | 4/1990 | Lustig et al. | 426/415 |

FOREIGN PATENT DOCUMENTS

982923 2/1976 Canada .

OTHER PUBLICATIONS

"ADM Corn Processing The Polyclean Process" Archer Daniels Midland Company, Decatur, Ill. (1989).

Primary Examiner—Marianne Cintins
Assistant Examiner—Helen Pratt
Attorney, Agent, or Firm—John C. LeFever

[57] ABSTRACT

A flexible multilayer film tube has an inner layer comprising a blend of thermoplastic polymer and starch particles in protruding relationship with the inside surface which, after oxidation, develops improved meat adhesion during in situ cooking.

51 Claims, No Drawings

MULTILAYER FILM TUBE FOR COOK-IN MEAT ADHESION AND METHOD OF MAKING

RELATED PATENT AND APPLICATION

This application is a continuation-in-part of application Ser. No. 07/252,409 filed Oct. 3, 1988 in the names of S. Lustig and J. M. Schuetz and issued as U.S. Pat. No. 4,915,963 which in turn is a continuation of application Ser. No. 07/126336 filed Nov. 30, 1987 and issued as U.S. Pat. No. 4,784,863.

BACKGROUND OF THE INVENTION

This invention relates generally to a multilayer film, a meat product package comprising an enclosing multilayer film and an insitu aqueous medium-cooked meat product, i.e., the cook-in type, and a method for preparing a cooked meat product. In the method of the invention the meat is placed in a flexible tube formed of this film, hermetically sealed and insitu cooked by an aqueous medium. During the insitu cooking, the film inside surface is against the meat outer surface and develops a contiguous adhering relation therewith.

There are numerous requirements for a multilayer cook-in shrink film including: delamination resistance, low oxygen permeability, and high temperature strength. For certain end uses as for example packaging of chunked and formed meat products for cook-in, the film should provide heat shrinkability representing about 30–50% shrinkability at about 90° C. Another very desirable characteristic for meat cook-in shrink films is adherence to the meat outer surface thereby preventing "cook-out", which is the collection of juices between the meat outer surface and film inner surface.

Probably the most commonly used inner layer in multilayer barrier-type shrink films is ethylene vinyl acetate. However, the prior art has recognized that ethylene vinyl acetate (EVA) does not provide good meat adhesion. For example, Judd et al U.S. Pat. No. 4,463,778 teaches that regenerated cellulose casings may be internally treated with vinyl acetate polymer to produce a coating which causes the casing to adhere to dry sausage emulsion and follow the sausage shrinkage during curing, but provide a low level of meat adhesion. In this manner the coating readily releases from the dried sausage emulsion when the casing is separated therefrom.

Because of the notoriously poor adhesion of ethylene vinyl acetate to meat, the prior art has employed various coatings or layers between an EVA substrate and the meat to provide good adhesion. Also, the prior art has developed a number of multilayer plastic cook-in films and certain of these are in commercial use. For example Bieler et al U.S. Pat. No. 4,104,404 describes a ten layer film comprising four central nylon layers, an ionomer layer on each outer side of the central layers, and two outer polyethylene layers on each outer side of the ionomer layers. The patentee demonstrates that delamination of the outer polyethylene layer under cook-in conditions was only avoided by irradiation dosage of the entire multilayer film at a level of at least 6 MR. This film does not appear to provide high meat adhesion.

Another commercially employed cook-in film is the type described in Oberle et al U.S. Pat. No. 4,469,742, comprising six layers irradiated to dosage of at least 6 MR. The central barrier layer is hydrolyzed ethylene-vinyl acetate copolymer (EVOH), chosen because of its higher softening point and superior oxygen barrier properties as compared to the saran-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5–12 wt.%. The innermost (heat sealing) layer may for example be a propylene-ethylene random copolymer (PER). If meat adhesion is required, an additional ionomer layer is used as the innermost layer.

One general concern in the extrusion manufacture of multilayer films containing EVOH is that the process conditions be such that gel formation is avoided. This may occur if resins are retained in the extruder passages and exposed to heat for prolonged periods so as to form oxidized particles which ultimately cause bubble breakage or appear in the finished film.

It will be apparent from the foregoing that these prior art cook-in films are complex both in terms of multiple materials and sophisticated manufacturing techniques i.e. six layers and relatively high irradiation dosage level to avoid delamination. Further, some of these films do not provide meat adhesion and an additional layer is needed for this specific purpose.

It should also be recognized that the ease of establishing and maintaining good adhesion between a cook-in film inside surface and the meat depends to some extent on the type of meat. For example, with most meats, including premium grade ham having less than about 10% fat and usually less than about 5% high collagen meat protein of the total available meat portion, it is less difficult to achieve good meat adhesion and little fat-out than with high fat content meats wherein the fat is in the suspended state. In particular, when the meat to be cooked insitu is a commodity style boiled ham having a product composition of more than about 10% fat and usually more than about 5% high collagen meat portion, it is much more difficult to obtain and maintain good meat adhesion.

One approach to this problem is to apply starch particles to the outer surface of the EVA inner layer of a multilayer film. This is preferably done by applying the starch particles to the hot EVA surface as an integral part of a coextrusion process forming the multilayer film. Alternatively, dispersion may be accomplished by dusting the starch particles on the cooled surface. The external starch particle-containing EVA surface is then irradiated. During insitu cooking, excellent adhesion develops with low fat and/or low collagen meats or other meats of the gel state fat type as for example fleishwurst. In ham, fat is in a state of suspension whereas in fleishwurst the fat is in the gel condition. The latter is much more stable and less prone to separate during cooking. This means that meat adhesion to the film inner surface is more readily developed during insitu cooking and maintained thereafter. The above-described external starch system has been quite successful in commercial use with low fat and/or low collagen as well as the gel state fat types of cook-in meats, but does not provide sufficient adhesion with the high fat/-high collagen meats such as commodity style boiled hams.

Starch is currently supplied in concentrate form for inclusion in thermoplastic formulations to manufacture biodegradable plastics as for example in the form of films. By a combination of biological and chemical processes over a finite time period, these biodegradable films initially experience deterioration or loss of physical properties. These processes facilitate a breakdown of the primary molecular structure (i.e. the film polymer chains) ultimately rendering it to a state in which direct biological attack can occur. One such starch concentrate is Polygrade II 20835, manufactured by Ampacet Corporation, Mt. Vernon, N.Y. This starch concentrate comprises 60% linear low density polyethylene (LLDPE), 38% starch and 2% oxidation promoter, all by weight.

One object of this invention is to provide a flexible tube formed of multilayer film having less than six layers and with an inner layer providing improved adhering relation to high fat and/or high collagen type meat product of the suspended fat type during insitu cooking in an aqueous medium.

Another object of this invention is to provide a meat product package including an insitu aqueous medium-cooked high fat/high collagen meat product with its outer surface in adhering relation to the inner layer of a multilayer film having less than six layers and which satisfies the other requirements of a cook-in film.

A further object is to provide such a high fat/high collagen meat product package with a three layer film.

Still another object is to provide a method for preparing an insitu cooked high fat and/or high collagen meat product of the suspended fat type in a flexible tube having less than six layers, with improved adhering relation between the meat outer layer and film inner layer.

SUMMARY OF THE INVENTION

One aspect of the invention relates to a flexible tube formed of multilayer film comprising an inner layer, a barrier layer with its inner side adhered to the outer side of the inner layer, and an outer layer with its inner side adhered to the outer side of the barrier layer. The improvement comprises an inner layer formed of a blend comprising thermoplastic polymer and starch particles substantially uniformly distributed through the inner layer such that the starch at the inside surface of this inner layer is present in quantity of at least about 4 grams/1000 ft.$^2$ inside surface. A portion of this starch is proximate the inner layer inside surface in protruding relationship so that the inside surface is randomly uneven. At least the thermoplastic polymer-starch blend inner layer inside surface is oxidized, preferably by irradiation at dosage of at least about 2 MR and preferably less than about 5 MR. Alternatively, the inside surface may be oxidized by corona discharge. The starch distribution at the inner layer inside surface is preferably at least about 10 grams/1000 ft.$^2$ inside surface and preferably less than about 40 grams/1000 ft.$^2$ inside surface. The inner layer thermoplastic polymer is preferably (although not necessarily) EVA having between about 3% and about 18% by weight vinyl acetate. In the experiments described hereinafter, some of the individual starch particles can be visually seen as protruding outwardly from the layer interior towards the inside surface without actually penetrating this surface.

Another aspect of the invention is a method for preparing a cooked meat product. A flexible tube is provided which is formed of multilayer film comprising at least three layers including an inner layer comprising a blend of thermoplastic polymer and starch, a barrier layer with its inner side adhered to the outer side of the inner layer, and an outer layer with its inner side adhered to the outer side of the barrier layer. The starch particles are substantially uniformly distributed through the inner layer such that the starch at the inside surface of this inner layer is present in quantity of at least about 4 grams/1000 ft.$^2$ inside surface. A portion of the starch is proximate the inner layer inside surface in protruding relationship so that the inside surface is randomly uneven. The thermoplastic polymer is Preferably EVA having vinyl acetate content between about 3% and about 18% by weight. At least the inside surface of the starch thermoplastic polymer blend inner layer is oxidized, preferably by irradiation at dosage of at least about 2 MR. Alternatively, the inside surface may be oxidized by corona discharge.

One end of the tube is sealed and the tube stuffed with uncooked meat so that the meat outer surface is in direct contact with the inside surface of the thermoplastic polymer-starch blend containing inner layer. The open end of the uncooked meat-containing tube is sealed and the meat cooked in the sealed tube by contacting the stuffed tube outer surface with a heat aqueous medium. The cooking meat outer surface is simultaneously adhered to the tube inside surface. The uncooked meat is preferably ham containing more than about 10% fat and more than about 5% collagen meat protein of the total available meat portion.

Still another aspect of the invention is a meat product package comprising an enclosing multilayer film having an inner layer and an insitu aqueous medium-cooked meat product with its outer surface in adhering relation to the inner layer. The meat product is preferably ham containing more than about 10% fat and more than about 5% collagen meat protein of the total available meat portion. The multilayer film of this package comprises at least three layers with a barrier layer as the core. The inner layer on one side of the barrier layer comprises a blend of thermoplastic polymer and starch particles, and an outer layer is provided on the opposite side of the barrier layer. The starch particles are substantially uniformly distributed through the inner layer such that the starch at the inside surface of this inner layer is present in quantity of at least about 4 grams/1000 ft.$^2$ inside surface. A portion of the starch is proximate the inner layer inside surface in protruding relationship so that the inside surface is randomly uneven. The thermoplastic polymer of the inner layer blend is preferably EVA having between about 3% and about 18% vinyl acetate content. At least the distributed starch-containing inner layer is oxidized, preferably by irradiation at dosage of at least 2 MR, most preferably less than 5 MR.

As will be demonstrated, this meat product package has good meat adhesion, little fat-out, good layer adhesion, requires no more than three layers in the enclosing multilayer film, and relatively low irradiation level. These advantages are surprising because of the prior art teachings with respect to EVA meat adhesion, and the well-known use of starch as an antiblock agent in multilayer films. As previously discussed, the poor adhesion of EVA to cook-in meat is well-known and finely dispersed starch has been extensively used to prevent sticking of contiguously associated thermoplastic films. The high adhesion to high fat/high collagen meats is especially surprising in view of the relatively poor adhesion experienced with this type meat using the previously described irradiated external starch particle-EVA surface type film. That is, the improved meat adhesion generally experienced with such films is believed to depend on glucose formation during the irradiation. It appears that during the insitu cooking process, the starch-derived glucose reacts with meat juices to form a sticky mass which bonds the EVA surface and the meat. Under these circumstances one would expect higher adhesion with all types of meat when the starch particles are on the outside surface of the EVA film in direct contact with the meat rather than being located inside the EVA film.

DEFINITIONS

As used herein, the terms set forth below will be understood to have the following meanings:

"Copolymer" includes terpolymers. "Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Cook-in" refers to packaging material structurally capable of withstanding exposure to long and slow cooking conditions while containing a food product for insitu cooking, for example submersion in water at 70°-80° C. for 4-6 hours, or cooking in steam. Cook-in packaged meats are essentially pre-packaged, pre-cooked meats which are directly transferred to the retailer in this form. These types of meats may be consumed with or without warming. Cook-in packaging materials maintain seal integrity and in the case of multilayer films, are delamination resistant. Cook-in films are preferably heat shrinkable under cook-in conditions so as to form a tightly fitting package. In the present invention they must also adhere to the cooked meats, thereby preventing cook-out.

"Meat product" means edible food containing meat.

"Oxidized" means that the surface has been exposed to sufficiently high electric energy to substantially increase the presence of oxidized molecules on the surface, as for example by silent electric discharge corona treatment or irradiation treatment. "Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

"Adhering relation" between the aqueous medium cooked meat outer surface and the multilayer film means that based on a peel test with a universal testing machine such as the Inston Model TM (Instron Corporation, Canton, Mass.), at a pull rate of 10 in./minute the film will not separate from the meat at a force below about 10 grams/inch.

The inner layer of the multilayer film of this meat product package is in direct, adhesive contact with the cooked meat on one side and for a three layer film embodiment the inner layer is contiguously associated with the core layer on its other side. Even if the film has more than three layers, this other side of the film inner layer must be integral with another film layer so as not to delaminate under the aqueous medium cook-in conditions. The film inner layer is also primarily responsible for processibility of this film, for example affording the needed stretchability for biaxial orientation.

The thickness of the inner layer is preferably between about 0.5 and about 2.0 mils. Thinner layers may not perform the aforedescribed functions while thicker layers do not appreciably improve processability of the film and may reduce total film performance.

The film inner layer comprises a blend of one or more thermoplastic materials and starch particles. Preferred thermoplastic materials are ethylene polymers as for example high density polyethylene (HDPE), linear low density polyethylene (LLDPE) and very low or ultra low density polyethylene (VLDPE or ULDPE). The main requirements for suitable thermoplastic materials are that starch particles be readily mixable therewith to form a blend wherein the minor component starch particles are substantially uniformly dispersed in the major component thermoplastic material, which blend can be readily processed into a film (as for example by extrusion) wherein the starch particles are still substantially uniformly dispersed throughout the film thickness and across the film surface. Moreover, the thermoplastic material must have sufficient toughness, i.e., hot water puncture strength, that the film surfaces are not physically penetrated by the starch particles protruding therefrom, either at ambient temperature or the elevated temperatures typical of cook-in use, e.g. 100° C.

The film inner layer most preferably includes ethylene vinyl acetate (EVA) which has between about 3% and about 18% by weight vinyl acetate (VA). The vinyl acetate content of the EVA should be at least about 3 weight % to provide the desired high shrink and adhesion to the contiguous layer, but no higher than about 18 weight % to allow the needed biaxial orientation and cook-in performance. Higher vinyl acetate content makes the film excessively soft and not capable of biaxial orientation. A preferred balance between these characteristics is a vinyl acetate content of between about 6 and about 15 weight % of the ethylene vinyl acetate.

The melt index of the ethylene vinyl acetate inner layer is preferably between about 0.1 and 1.0. Lower melt indexes are undesirable because the resulting high viscosities make extrusion very difficult, whereas higher melt indexes are to be avoided because orientation strength is diminished.

The film inner layer may also be formed of a thermoplastic material blend comprising a first thermoplastic material as for example, and an unneutralized copolymer of an alpha-olefin having the formula $RHC=CH_2$ wherein R is H or $C_1$ to $C_8$ alkyl and an alpha, beta-ethylenically unsaturated carboxylic acid. This unneutralized copolymer is preferably ethylene acrylic acid (hereinafter "EAA"). The EVA content of this blend is preferably between about 30% and about 75%, and the EAA content between about 25% and about 70%, all by weight. This particular blend (with or without starch) as the inner layer of a multilayer tube provides improved adhesion to insitu-cooked meat of the suspended fat type having high fat and/or high collagen content. It is separately claimed in copending application Ser. No. 07/444,588 filed Dec. 1, 1989 in the names of R. L. R. Juhl, J. M. Schuetz and S. Lustig as coinventors.

For satisfactory meat adhesion, the inner layer should contain sufficient starch substantially uniformly distributed throughout the layer such that the starch at the inside surface of the inner layer is present in quantity of at least about 4 grams/1000 ft.$^2$ inside surface and a portion thereof is proximate the inside surface in protruding relationship so that the inside surface is randomly uneven. Lower loadings do not provide acceptable adhesion.

Starch loadings of at least 10 grams/1000 ft.$^2$ inside surface are preferred to compensate for possible nonuniformities in distribution from the blending and extrusion steps. Loadings in excess of about 40 grams starch/1000 ft.$^2$ inside surface are not preferred because such high concentrations tend to adversely affect physical properties of the film, i.e. haze, tear strength and puncture strength. A convenient basis for achieving any desired internal distribution within the inner layer takes into consideration the layer thickness and the starch average particle size. The approximation is as follows:

starch internal distribution = starch particle average radius divided by inner layer thickness × 100.

Starch is commercially available as a white, odorless granular or powdery material, and chemically is a complex carbohydrate of the formula $(C_6H_{10}O_5)_x$ where X may be about 250–4000. Starch derived from corn ("corn starch") is particularly convenient for use because its particle size and shape makes it easy for blending with thermoplastic resin. There are some indications that untreated potato starch may give superior results. Other starches as for example those derived from rice or other plants may also be used.

The starch particles must be substantially uniformly distributed through the inner layer to achieve this distribution proximate the inner surface. This may be achieved by blending the starch particles and the thermoplastic resin using any commercial mixer, and thereafter extruding the blend.

At least the starch-containing inner layer inside surface of the multilayer film of this invention is oxidized, as for example by irradiation at dosage of at least about 2 MR. This is necessary to provide the meat adhesion characteristic. Irradiation also improves inner layer-barrier layer bonding and film strength at cook-in conditions. Lower irradiation levels do not provide these characteristics to the extent required for the cook-in meat product package. The irradiation dosage is preferably below about 5 MR as higher levels tend to degrade the elongation properties of the film.

Although only the inner layer inside surface need be oxidized, it is preferred to irradiate the entire film so as to maximize film strength and interlayer adhesion. This may be performed prior to biaxial orientation but is preferably done after this step on the stretched and thinner film. Alternatively, if only the inner layer is to be oxidized the multilayer film may be fabricated in the manner described in U.S. Pat. No. 3,741,253. This involves first extruding the starch-containing EVA inner layer, oxidizing this layer's inside surface as for example by irradiation and then forming the other nonirradiated layers thereon. In this instance adhesives may be required to provide the needed interlayer adhesion.

Although not fully understood, the unexpectedly high meat adhesive phenomenon of the oxidized starch particle-thermoplastic blend inner layer may depend on glucose formation during the oxidation. During the insitu cooking process, either the meat juices or the glucose or both of these fluids may diffuse through the film inner layer inner surface. The starch-derived glucose may react with meat juices to form a sticky mass which bonds the thermoplastic surface and the meat. As will be demonstrated hereinafter, with at least the high fat and/or high collagen meats of the suspended fat type, starch uniformly distributed within the film layer and proximate the inner layer inside surface in protruding relationship unexpectedly provides remarkably better adhesion than starch distributed outside this film layer. This may be because the protruding starch particles create a much more roughened surface than the externally distributed starch, and the former traps more air during the oxidation and produces more oxygenated species on the surface. These species tend to be meat adhering.

The outer layer of the enclosing multilayer film is on the opposite side of the core layer from the inner layer, and in the preferred three layer embodiment the outer layer is both directly adhered to the core layer and in direct contact with the environment including the aqueous heating medium (either steam or water) during cook-in. Since it is seen by the use/consumer, it must enhance optical properties of the film. Also, it must withstand contact with sharp objects so is termed the abuse layer and provides abrasion resistance.

The outer layer is preferably formed of ethylene vinyl acetate, and more preferably with the same range of between about 3% and about 18% vinyl acetate content for the same reasons as in the inner layer. Also, the melt index of the EVA outer layer is preferably between about 0.1 and about 1.0 for the same reasons previously discussed in connection with the inner layer.

Alternatively, the outer layer may be formed of other thermoplastic materials as for example polypropylene, ethylene-propylene copolymer, ionomer or a member of the polyethylene family such as linear low density polyethylene (LLDPE), very low or ultra low density polyethylene (VLDPE and ULDPE) respectively, or blends of these materials.

The outer layer thickness is preferably between about 0.5 and 1.0 mils. Thinner layers may be less effective in performing the abuse resistance projection, while thicker layers may reduce film stretchability.

The functional requirement of the barrier layer is that together with the other layers it must provide an oxygen transmission rate through the entire multilayer film below about 5 cc/100 in.$^2$/24 hrs/Atm. This is necessary to avoid spoilage of the meat enclosed in the cook-in film package due to oxygen passage from the environment through the film wall. This requirement may be satisfied by numerous well-known barrier layer materials as for example certain of the polyamides (Nylon), hydrolyzed ethylene vinyl acetate copolymer (EVOH) and preferably a vinylidene copolymer, most preferably a vinylidene chloride-methyl acrylate copolymer i.e. MA-VDC. One reason why an MA-VDC type barrier layer is preferred is that this particular copolymer does not discolor to a substantial extent when irradiated at moderate doses, i.e. up to about 5 MR. Other reasons for this preference are that the oxygen barrier property is not affected by moisture, adhesive layers are not required and discoloration during cooking is minimal.

The barrier layer thickness is preferably between about 0.1 and about 0.5 mils. Thinner barrier layers may not perform the intended function and thicker layers do not appreciably improve performance for the cook-in function.

The thickness of the aforedescribed three layer film is preferably between about 2.0 and 3.5 mils. Lower thicknesses reduce the effectiveness of at least one of the three layers in performing the aforedescribed functions, while higher thicknesses reduce the film flexibility and do not appreciably improve its performance.

In general, various conventional additives such as slip agents and pigments can be incorporated in the film in accordance with conventional practice.

While this invention is specifically described in terms of three layers, it should be understood that one or more additional layers may be directly adhered to the inside or outside of the outer layer or between the barrier layer and the inner layer, but not inside the inner layer. For example, a fourth layer may be interposed between an EVA outer layer and the barrier layer or between the latter and an EVA-starch blend inner layer. This fourth layer may for example be LLDPE, VLDPE, polypropylene, nylon, ionomer, or blends thereof.

The multilayer film of this invention is preferably manufactured in tubular form by simultaneous coextrusion of at least three layers using the conventional double bubble technique. This primary tube is biaxially oriented by stretching with internal pressure in the transverse direction and with the use of pinch rolls at different speeds in the machine direction. Then the bubble is collapsed. After cooling, the biaxially oriented tube is flattened and preferably guided thorugh an ionizing radiation field at a dosage of at least about 2 MR as the oxidizing treatment.

The stretch ratio in the biaxial orientation is preferably sufficient to provide a multilayer film with total thickness of between about 1.5 and 3.5 mils. A stretch ratio (MD stretch multiplied by TD stretch) of about 8-25:1 will impart a shrink capacity of about 30-35% biaxial free shrinkage at 90° C. (based on ASTM D2732).

The multilayer film is preferably wound up as flattened, seamless, tubular film. The cook-in tubes may then be formed into bags by end seals, typically made by clips or by transverse heat sealing across the width of flattened tubing followed by severing the tubing so that the transverse seal forms the bag bottom. Alternatively side-seal bags may be formed in which the transverse seals form the bags sides and one edge of the tubing forms the bag bottom, or the tubular stock may be slit into sheet stock for further forming into back-seamed tubes by forming an overlap or fin-type seal.

To prepare the meat product package, cook-in tubes (casings) fabricated from the aforedescribed multilayer film are used by placing the uncooked meat in the tube, and sealing the open portion as by clipping. The meat-containing tube is then ready for cooking as described hereinafter.

The following examples illustrate certain embodiments of the invention and compare same with commercially available meat packages.

EXAMPLE I

In this example, flexible tubes of about 8½ inches flat width three layer films comprising samples 1-4 were prepared by coextrusion into structures including various inner layers of 1.5 mil thickness, and identical barrier layers and outer layers. The barrier was a 0.3 mil thick layer formed of a blend comprising vinylidene chloride-vinyl chloride copolymer and vinylidene chloride methyl acrylate copolymer. The methyl acrylate comprised 6 wt. % and the vinyl chloride comprised 7.2 wt. % of the blend. The outer layer was formed from a blend of 75 wt. % ultra low density polyethylene of 0.912 density having a melt index of 1.0 (prepared from Dow Chemical Company resin product Attane 4001) and 25 wt. % EVA having a melt index of 0.25 (prepared from DuPont resin product Elvax 3135X). The outer layer had a thickness of about 0.6 mil, so that the total film thickness was about 2.8 mils. For all samples, 12 gms/1000 ft.$^2$ film surface area of OxyDry C-5 corn starch powder (manufactured by OxyDry Corporation) was applied to the hot inner layer through the extrusion die as a substantially uniform dispersion of particles having major dimensions of about 15 microns particle size.

Sample 1 had a 100% EVA inner layer with vinyl acetate content of 10 wt. % and melt index of 0.25 (prepared from Union Carbide Corporation resin product 6833). Sample 2 had an inner layer comprising a blend of 50 wt. % EVA identical to that used in Sample 1, and 50 wt. % ionomer (prepared from DuPont Company resin product Surlyn 1601). Sample 3 had an inner layer comprising a blend of the same EVA used in Sample 1 and 10% starch concentrate (the aforedescribed Ampacet Polygrade II 20835), so that the internal starch comprised 3.8% by weight of the blend and EVA comprised 90% of the balance. The blend was prepared by conventional heated mixing of the two types of pellets, followed by heating and melting for extrusion. The individual starch particles may have major dimensions as large as 100 microns, and could be seen underneath the inside surface of the inner EVA layer. Assuming uniform distribution across the 1.5 mil thick layer, the Sample 3 starch distribution was about 15 gms/1,000 ft$_2$ film inner layer inside surface area. Sample 4 had an inner layer comprising a blend of the same EVA used in Sample 1, ethylene acrylic acid copolymer (PRIMACOR TM type 1410XT supplied by Dow Chemical Company, Midland, Mich.), and 5% starch concentrate of the aforedescribed type. This internal starch comprised 1.9% by weight of the blend corresponding to a starch distribution of about 7.5 gms/1000 ft$^2$ film inner layer inside surface area. The remainder of the Sample 4 blend was 24.5% EAA and 73.6% EVA. Sample 5 was a commercially used cook-in film manufactured by W. R. Grace Company's Cryovac Division and sold with a product designation CN-510. This 3.5 mils thick film has an inner ionomer layer and is believed to comprise a total of six layers, as generally described in the aforementioned U.S. Pat. No. 4,469,742. The individual layers are probably as follows: ionomer (inner)-/EVA/adhesive/EVOH/adhesive/EVA (outer).

After biaxial orientation, the Sample 1-4 films were irradiated to a dosage of about 4 MR. Each sample had a starch external coating on the EVA inner layer inside surface and Samples 3 and 4 also had starch in the inner layer itself uniformly dispersed across its inside surface. Accordingly, Samples 3 and 4 represent two different embodiments of the invention.

These tube samples along with Sample 5 were then clipped at one end and stuffed with ground ham trim and shank meat. The latter primarily comprised particles of about 5/64 inch size having protein content of about 11-12% and fat content of about 21-22%. The stuff temperature was 47° F.

Five 10 lb. (precooking weight) product meat packages were made from each film type. The tubes were stuffed on a Tipper Tie RS 4201 type commercial stuffing machine to a circumference equal to twice the tube flat width. The stuffed tube lengths were 12.5-13.0 inches and placed in molds 12½ inches long. 4¾ inches wide and 5½ inches deep. A 160° F. water bath was used to cook the hams for 4¾-5 hours to an internal temperature of 152° F. The cooked ham was cooled to an internal temperature of 70° F. and then separated from the molds.

All meat product packages were tested for meat adhesion. In this test the meat product package was fastened to a horizontal plane which was affixed to the crosshead of the aforedescribed commercially available testing machine. A one inch wide by six inch long test specimen was slit in the meat product package. A clamp connected to the load cell of the testing machine by means of a low friction pulley was attached to one end of the test specimen. The test was initiated by lowering the plane at a rate of 10 inches per minute, and the force required to pull the test specimen at a 180° angle from the encased meat was the "meat adhesion". Four samples were tested from each meat product package, and the results averaged. Adhesion was also evaluated by weighing the amount of meat adhered to the film inner layer inner surface after removal from the cooked meat. A third approach to adhesion evaluation was to weigh all of the material (i.e., "purge") comprising liquid and solid, accumulating between the cooked meat outer surface and the film inner surface, which material was released and collected when the film was separated from the meat.

The results of these tests are summarized in Tables A and B.

TABLE A

| | High Fat Meat Adhesion Quantity | | |
|---|---|---|---|
| | | Cook-Out Fluid | |
| Sample No.* | Adhered Meat mg/cm$^2$ | (gm) | (% Product Weight) |
| 1 | 2.42 | 106.5 | 2.33 |
| 2 | 3.30 | 93.4 | 2.03 |
| 3 | 10.67 | 23.3 | 0.52 |
| 4 | 11.01 | 8.9 | 0.20 |

TABLE B

| | High Fat Meat Removal Force | |
|---|---|---|
| Sample No.* | Inner Layer | Meat Adhesion (gms) |
| 1 | 100% EVA | 28 |
| 2 | 50% EVA, 50% ionomer | 33 |
| 3 | 96.2% EVA, 3.8% internal starch | 55 |
| 4 | 73.6% EVA, 24.5% EAA, 1.9% internal starch | 44 |
| 5 | 100% ionomer | 55 |

*Samples 1-4 had a starch external coating on inner layer inside surface.

Inspection of Tables A and B indicates that Sample 3, an embodiment of this invention with a 96.2% EVA-3.8% starch blend inner layer (and an external coating of starch particles), is far superior in all aspects of adhesion to Sample 1, the 100% EVA inner layer with only an external coating of starch particles. That is, the quantity of adhered meat was much higher, the quantity of cook-out fluid much lower, and the adhesive removal force much higher. This relative performance was quite unexpected because the Sample 1 type film is commercially used and provides high adhesion with low fat/low collagen type meats and meats wherein the fat is held in the gel state, e.g. fleishwurst. The adhesion values for Sample 3 are similar to those of Sample 5, the 100% ionomer inner layer type six layer film widely used as a cook-in film for difficulty adhering high fat and/or high collagen meats of the suspended fat type. This performance is remarkable in view of the much simpler and less expensive three layer characteristic of Sample 3.

Tables A and B also show that invention embodiment Sample 3 is much superior to the 50% EVA-50% ionomer inner layer type Sample 2. This was surprising because ionomer-type compositions are widely believed to provide superior meat adhesion characteristics to EVA-based compositions.

Finally, Tables A and B show that by a comparison of Samples 4 and 1, the EVA-EAA-starch concentrate blend inner layer also provides substantially improved meat adhesion properties over a 100% EVA inner layer (each having an external coating of starch particles).

EXAMPLE II

Like Example I, this Example II demonstrates improved meat adhesion by practice of a preferred embodiment of the invention wherein the inner layer is a blend of starch particles and EVA. Unlike Example 1, in these tests starch was not applied to the inner EVA layer both internally and externally, only one or the other. Accordingly, a direct comparison can be made in terms of adhesion performance.

Flexible tubes of about 10 inches flat width comprising Samples 6-8 were prepared by coextrusion into three layer structures including various inner layers but identical barrier layers and outer layers. The manufacturing method was substantially the same as Samples 1-4 (Example 1) and the barrier and outer layers were the same as described in Example 1. The EVA in all of the inner layers contained 10 wt. %vinyl acetate. The thicknesses of the various layers were identical to Example 1 and the procedure for blending of the starch concentrate (Ampacet Polygrade II 20835) in Samples 7 and 8 was identical to that of Samples 3 and 4. Samples 6-8 were likewise irradiated to a dosage of about 4 MR after biaxial orientation.

Sample 6 was identical to the previously described Sample 1, with only external starch addition at a distribution of about 12 gms/1000 ft.$^2$ film surface area. Sample 7 had an inner layer comprising a blend of the same EVA and 5% starch concentrate of the aforementioned type, corresponding to an internal starch distribution of about 7.5 gms/1000 ft.$^2$ film surface area—the same as Example 4. Sample 8 had an inner layer comprising a blend of the same EVA and 20% starch concentrate of the aforementioned type. This internal starch comprised 7.6% by weight of the blend with the remaining 92.4% being EVA. This corresponds to a starch distribution of about 30.0 gms/1000 ft.$^2$ film inner layer inside surface area. In both Samples 7 and 8 a portion of the starch was observed as being proximate the inner film layer inside surface in protruding relationship so that the film inside surface was randomly uneven. Sample 9 was identical to the previously described commercially used cook-in film manufactured by W. R. Grace and designated type CN-510 with an inner ionomer layer and probably a total of six layers (see Sample 5).

Six flexible tubes prepared from each sample film were hand stuffed with chunked water-added ham having particle size of about ⅛ inch (pump level of 40% added pickle solution, high fat, 16% cured shank). The tube stuffed circumference was targeted at twice the flat width plus one inch and was closed by a commercial tying machine (Tipper Press Tie). The stuffed samples were steam cooked using a gentle cycle until the internal temperature of the cooked meat reached 150° F. The product packages were then tap water showered for 30 minutes and stored at 40° F.

Adhesion between the film inside surface and the meat outside surface was evaluated using the aforedescribed procedure by weighing all of the liquid and solid (purge) accumulating between the two surfaces. The results of these tests are summarized in Tables C and D.

TABLE C

Internal vs. External Starch

| Sample No. | Inner Layer | Stuffed Circumferences (Inches) |
|---|---|---|
| 6 | 100% EVA, external starch | 22.3 |
| 7 | 98.1% EVA, 1.9% internal starch | 20.5 |
| 8 | 92.4% EVA, 7.6% internal starch | 19.3 |
| 9 | 100% ionomer | 17.9 |

TABLE D

Adhesion Evaluation by Purge

| Sample No. | Cook-Out Material (% Product Weight) |
|---|---|
| 6 | 3.05 |
| 7 | 0.85 |
| 8 | 0.77 |
| 9 | 0.81 |

Tables C and D show that even with high fat-high collagen type meat of the suspended fat type, substantially equivalent meat adhesion performance to the prior art commercially employed six layer film may be achieved with an embodiment of the invention wherein the starch is only employed inside the inner layer of a three layer film. This can be seen by comparing the purge percent of Samples 7 and 8 with that of prior art Sample 9.

Tables C and D also show that for this particular type of meat wherein film adhesion is difficult to achieve, the internally distributed starch in accordance with this invention (Samples 7 and 8) provide unexpectedly superior adhesion to externally distributed starch. That is, the purge percent of Samples 7 and 8 was only about one-quarter that of Sample 9. This was unexpected because the distributions of starch at the inner layer inside surface for samples 6 and 7 were the same order of magnitude. A possible explanation for this remarkable difference is the generation (by irradiation) of more meat adhering species on the film inside surface due to its roughened condition, as previously explained.

EXAMPLE III

This Example demonstrates that the starch added to the ethylene copolymer to form the inner layer of the instant multilayer film may be in the pure form as distinguished from the concentrate blend used in Examples I and II. The Example also demonstrates that the thermoplastic polymer of the inner layer need not be primarily ethylene vinyl acetate.

Flexible tubes of about 9-11 inches flat width diameter comprising Samples 10-13 were prepared by coextrusion into three layer structures including various inner layers but identical barrier layers and outer layers. The manufacturing method was substantially the same as Samples 1-4 (Example I) and the barrier and outer layers were the same as described in Example I. The EVA in all of the inner layers contained 10 weight % vinyl acetate. The thicknesses of the various layers were identical to Example I and the procedure for blending of the starch with the inner layer resins for Samples 12 and 13 was the same as described in Example I, i.e. by use of a commercial heated mixer. The starch used in the blend was the same type used for external application in Samples 10 and 11, i.e. the previously described Oxydry C-5 corn starch powder having major dimensions of about 15 microns particle size. Samples 10-13 were irradiated to a dosage of about 4 MR after biaxial orientation (same as all preceeding Samples 1-8).

Sample 10 was identical to the previously described Sample 1, with only external starch addition at a distribution of about 12 gms/1000 ft.$^2$ film surface area. Sample 11 had an inner layer comprising a blend of 65 weight % of the same EVA used in Sample 10 and 35 weight % ethylene acrylic acid copolymer (the aforedescribed PRIMACOR type 1410 XT). Sample 11 also had about 12 gms/1000 ft$^2$ film surface area externally distributed on the inside surface of the EVA inner layer.

Sample 12 had an inner layer comprising 98 weight % of the same EVA and 2 weight % of the aforedescribed starch. The latter corresponds to a starch distribution of about 7.0 gms/1000 ft/$^2$ film inner layer inside surface. Even though the starch distribution was substantially lower than Sample 8 (30.0 gms/1000 ft.$^2$) and about the same as Samples 4 and 7 (7.5 gms/1000 ft.$^2$), a portion of the starch particles was observed as being proximate the inner film layer inside surface in protruding relationship so that the film inside surface was randomly uneven. Sample 13 was identical to Sample 12 except that the inner layer contained linear low density polyethylene (LLDPE) in a quantity equal to the EVA, i.e., Exxon Chemical Company's type 3001 having 0.918 density. Accordingly, the inner layer comprised 49% EVA, 49% LLDPE and 2% starch. Again the starch particles were observed as proximate the inner film layer inside surface in protruding relationship. Three flexible tubes prepared from Samples 11-13 (and four tubes from control Sample 10) were hand stuffed with chunked water-added ham having 25% back fat and a natural proportion of shank meat ground to particle size of about ⅜ inch. The stuffed tubes were closed by a commercial tying machine and placed in the same molds used in Example I. The stuffed samples were steam cooked at 145° F. for 4½ hours, then 155° F. for 1 hour and then at 180° F. to an internal temperature of 152° F. The cooked ham was cooled to an internal temperature of 70° F. and then separated from the molds.

Meat adhesion removal force was measured in the same manner as in Example I as was the purge which comprised the liquid and solid accumulating between the cooked meat outer surface and the film inner surface measured as percent product weight. The results of these tests are summarized in Tables E and F.

TABLE E

Internal Pure Starch

| Sample No. | Inner Layer | Stuffed Circumferences (Inches) |
|---|---|---|
| 10 | 100% EVA, external starch | 23.87 |
| 11 | 65% EVA, 35% EAA external starch | 19.95 |

TABLE E-continued

Internal Pure Starch

| Sample No. | Inner Layer | Stuffed Circumferences (Inches) |
| --- | --- | --- |
| 12 | 98% EVA, 2% internal starch | 23.14 |
| 13 | 49% EVA, 49% LLDPE, 2% internal starch | 21.37 |

TABLE F

Internal Pure Starch Adhesion

| Sample No. | Purge (%) | Meat Adhesion (gms) |
| --- | --- | --- |
| 10 | 1.7 | 43 |
| 11 | 0.8 | — |
| 12 | 2.0* | 23** |
| 13 | 1.0 | 40 |

*Average of 1.0% and 2.9%;
**Test does not identify which purge % measurement this meat adhesion corresponds to.

Comparison of Samples 10 and 13 demonstrates that high adhesion may be achieved when the starch used in the inner layer formulation is in the pure form. That is, the purge with invention embodiment Sample 13 is substantially lower than Sample 10 with only external starch. This indicates superior adhesion for the meat product package of this invention, whereas the adhesion forces were substantially equivalent. This was surprising because the starch content of Sample 13 proximate the inner layer inside surface was only about 58% of the Sample 10.

Comparison of Samples 10 and 13 also demonstrates that in the practice of this invention, the inner layer need not be primarily ethylene vinyl acetate. On this basis it is believed that any thermoplastic material may be used to form the inner layer blend, provided that it has the aforedescribed properties.

While certain embodiments of this invention have been disclosed hereinabove, those skilled in the art will appreciate that changes and modifications may be made therein without departing from the spirit and scope of the invention. For example, oxidation of the film inner layer inside surface may be achieved by placing a high electric energy discharge bar very close to this surface with a discharge of about 10,000-15,000 volts so that a corona is generated. This in turn excites the oxygen atoms, creating free radical reactions and etching the surface. Oxidation of this surface may also be achieved by flame treatment, hot air (e.g. 500° F.) or chemical treatment, all as understood by those skilled in the art.

What is claimed is:

1. In a flexible tube formed of multilayer film of at least three layers comprising an inner layer, an oxygen barrier layer with its inner side adhered to the outer side of said inner layer and an outer layer with its inner side adhered to the outer side of said barrier layer, the improvement comprising an inner layer formed of a blend comprising thermoplastic polymer and starch particles substantially uniformly distributed through said inner layer such that the starch at the inside surface of said inner layer is present in quantity of at least about 4 grams/1000 ft.$^2$ inside surface and also present in quantity and particle size so that a portion of said starch particles are proximate said inside surface in visually protruding but not physically penetrating relationship so that said inside surface is randomly uneven, at least said inside surface being oxidized.

2. A flexible tube according to claim 1 wherein said thermoplastic polymer is ethylene vinyl acetate having between about 3% and about 18% by weight vinyl acetate.

3. A flexible tube according to claim 2 wherein said thermoplastic polymer is a blend of said ethylene vinyl acetate and polyethylene.

4. A flexible tube according to claim 1 wherein said inside surface is oxidized by irradiation at dosage of at least about 2 MR.

5. A flexible tube according to claim 1 wherein said inside surface is oxidized by corona treatment.

6. A flexible tube according to claim 1 wherein said starch at the inside surface of said inner layer is present in quantity of at least about 10 grams/1000 ft.$^2$ inside surface.

7. A flexible tube according to claim 1 wherein said starch at the inside surface of said inner layer is present in quantity between about 10 and about 40 grams/1000 ft.$^2$ inside surface.

8. A flexible tube according to claim 1 wherein the core layer is a vinylidene chloride copolymer.

9. A flexible tube according to claim 8 wherein the core layer is a vinylidene chloride-methyl acrylate copolymer.

10. A flexible tube according to claim 1 wherein the core layer is a hydrolyzed ethylene-vinyl acetate copolymer.

11. A flexible tube according to claim 1 wherein the outer layer is ethylene vinyl acetate.

12. A flexible tube according to claim 11 wherein the ethylene vinyl acetate outer layer has between about 6% and about 18% by weight vinyl acetate.

13. A flexible tube according to claim 2 wherein the ethylene vinyl acetate in said inner layer has a vinyl acetate weight content between about 6% and about 18%.

14. A flexible tube according to claim 2 wherein the ethylene vinyl acetate in said inner layer has a melt index between about 0.1 and about 1.0.

15. A flexible tube according to claim 1 wherein the inner layer blend has between about 25% and about 70% by weight of an unneutralized copolymer of an alpha olefin having the formula $RHC=CH_2$ wherein R is H or $C_1$ to $C_8$ alkyl and an alpha, beta ethylenically unsaturated carboxylic acid.

16. A flexible tube according to claim 15 wherein in said unneutralized copolymer, the olefin is ethylene and the carboxylic acid is acrylic acid or methacrylic acid.

17. A flexible tube according to claim 15 wherein said unneutralized copolymer is ethylene acrylic acid.

18. A flexible tube according to claim 4 wherein the entire multilayer film is irradiated.

19. A flexible tube formed of multilayer film comprising an inner layer, an oxygen barrier layer with its inner side adhered to the outer side of said inner layer and an outer side of said barrier layer, said inner layer formed of a blend comprising ethylene vinyl acetate having vinyl acetate weight content between about 6% and about 18%, and starch particles substantially uniformly distributed through said inner layer such that the starch at the inside surface of said inner layer is present in quantity between about 10 and about 40 grams/1000 ft$^2$ inside surface and also present in quantity and particle size so that a portion of said starch particles are proximate said inside surface in visually protruding but not physically penetrating relationship so that said inside surface is randomly uneven, and at least said inner layer is irradiated at dosage of at least about 2 MR.

20. A method for preparing a cooked meat product comprising the steps of:
   a) providing a flexible tube formed of multilayer film of at least three layers comprising an inner layer comprising a blend of thermoplastic polymer and starch, an oxygen barrier layer with its inner side adhered to the outer side of said inner layer, and an outer layer with its inner side adhered to the outer side of said barrier layer, said starch being substantially uniformly distributed through said inner layer such that the starch at the inside surface of said inner layer is present in quantity of at least about 4 grams/1000 ft.$^2$ inside surface and also present in quantity and particle size so that a portion of said starch particles are proximate said inside surface in visually protruding but not physically penetrating relationship so that said inside surface is randomly uneven, at least said inner layer being oxidized;
   b) sealing one end of said tube and stuffing said tube with uncooked meat so that the meat outer surface is in direct contact with said inside surface of the starch-containing inner layer;
   c) sealing the open end of the uncooked meat-containing tube; and
   d) cooking said meat in the sealed tube by contacting the stuffed tube outer surface with a heated aqueous medium and simultaneously adhering the cooking meat outer surface to the tube inside surface.

21. A method according to claim 20 wherein said thermoplastic polymer is ethylene vinyl acetate having between about 3% and about 18% by weight vinyl acetate.

22. A method according to claim 20 wherein said thermoplastic polymer is a blend of said ethylene vinyl acetate and polyethylene.

23. A method according to claim 20 wherein said inside surface is oxidized by irradiation at dosage of at least about 2 MR.

24. A method according to claim 20 wherein said inside surface is oxidized by corona treatment.

25. A method according to claim 20 wherein said starch within the inner layer is distributed across said inside surface in quantity of at least about 10 grams/1000 ft.$^2$ inside surface.

26. A method according to claim 20 wherein said starch within the inner layer is distributed across said inside surface in quantity between about 10 and about 40 grams/1000 ft.$^2$ inside surface.

27. A method according to claim 20 wherein the inner layer blend has between about 25% and about 70% by weight of an unneutralized copolymer of an alpha olefin having the formula $RHC=CH_2$ wherein R is H or $C_1$ to $C_8$ alkyl and an alpha, beta ethylenically unsaturated carboxylic acid.

28. A method according to claim 27 wherein in said unneutralized copolymer, the olefin is ethylene and the carboxylic acid is acrylic acid or methacrylic acid.

29. A method according to claim 27 wherein said unneutralized copolymer is ethylene acrylic acid.

30. A method according to claim 20 wherein said meat product is boiled ham containing on a weight basis more than about 10% fat.

31. A method according to claim 20 wherein said meat product is boiled ham containing more than about 10% fat and more than about 5% collagen meat protein of the total available meat portion, all on a weight basis.

32. A method according to claim 21 wherein the vinyl acetate content of said ethylene vinyl acetate in said inner layer is between about 6% and about 18% on a weight basis.

33. A method according to claim 23 wherein the entire multilayer film is irradiated.

34. A method for preparing a cooked meat product comprising the steps of:
   a) providing a flexible tube formed of multilayer film comprising an inner layer of a blend comprising starch and ethylene vinyl acetate having vinyl acetate weight, content between about 6% and about 18%, an oxygen barrier layer with its inner side adhered to the outer side of said inner layer, and an outer layer with its inner side adhered to the outer side of said barrier layer, said starch being substantially uniformly distributed through said inner layer such that the starch at the inside surface of said inner layer is present in quantity between about 10 and about 40 grams/1000 ft.$^2$ inside surface and also present in quantity and particle size so that a portion of said starch particles are proximate said inside surface in visually protruding but not physically penetrating relationship so that said inside surface is randomly uneven, and at least said inner layer is irradiated at dosage of at least about 2 MR;
   b) sealing one end of said tube and stuffing said tube with uncooked ham containing more than about 10% fat and more than about 5% collagen meat protein of the total available meat portion all on a weight basis, said stuffing being such that the ham outer surface is in direct contact with said inside surface of the starch-containing inner layer;
   c) sealing the open end of the uncooked ham-containing tube; and
   d) cooking said ham in the sealed tube by contacting the stuffed tube outer surface with a heated aqueous medium and simultaneously adhering the cooking ham outer surface to the tube inside surface.

35. A meat product package comprising an enclosing multilayer film having an inner layer and an insitu aqueous medium-cooked meat product with its outer surface in adhering relation to said inner layer, and with said multilayer film, comprising at least three layers an oxygen barrier layer as the core, said inner layer being formed of a blend comprising thermoplastic polymer and starch particles on one side of said barrier layer and an outer layer on the opposite side of said barrier layer, said starch particles being uniformly distributed through said inner layer such that the starch at the inside surface of said inner layer is present in quantity of at least about 4 grams/1000 ft.$^2$ inside surface and also present in quantity and particle size so that a portion of said starch particles are proximate said inside surface in visually protruding but not physically penetrating relationship so that said inside surface is randomly uneven, at least said inside surface being oxidized.

36. A meat product package according to claim 35 wherein said thermoplastic polymer is ethylene vinyl acetate having between about 3% and about 18% by weight vinyl acetate.

37. A meat product package according to claim 36 wherein said thermoplastic polymer is a blend of said ethylene vinyl acetate and polyethylene.

38. A meat product according to claim 35 wherein said inside surface is oxidized by irradiation at dosage of at least about 2 MR.

39. A meat product according to claim 35 wherein said inside surface is oxidized by corona treatment.

40. A meat product package according to claim 36 wherein the ethylene vinyl acetate inner layer has a melt index between about 0.1 and about 1.0.

41. A meat product package according to claim 35 wherein the core layer is a vinylidene chloride copolymer.

42. A meat product package according to claim 41 wherein the core layer is a vinylidene chloride-methyl acrylate copolymer.

43. A meat product package according to claim 35 wherein the outer layer is ethylene vinyl acetate.

44. A meat product package according to claim 43 wherein the ethylene vinyl acetate outer layer has between about 3% and about 18% by weight vinyl acetate.

45. A meat product package according to claim 44 wherein the ethylene vinyl acetate outer layer has a melt index between about 0.1 and about 1.0.

46. A meat product package according to claim 38 wherein the inner layer includes up to about 50 wt. %polyethylene.

47. A meat product package according to claim 35 wherein said starch within the inner layer is distributed across said inside surface in quantity of at least at about 10 grams/1000 ft.$^2$ inside surface.

48. A meat product package according to claim 35 wherein said starch within the inner layer is distributed across said inside surface in quantity between about 10 and about 40 grams/1000 ft.$^2$ inside surface.

49. A meat product package according to claim 38 wherein the entire film is irradiated.

50. A meat product package according to claim 49 wherein the film is irradiated at less than about 5 MR.

51. A boiled ham product package comprising an enclosing three layer film having an inner layer, and an insitu aqueous medium-cooked ham product containing more than about 10% fat and more than about 5% collagen meat protein of the total available meat portion all on a weight basis, the outer surface of said ham product being in adhering relation to said inner layer, said three layer film comprising a vinylidene chloride copolymer oxygen barrier layer as the core; an ethylene vinyl acetate inner layer on one side of said barrier layer having between about 3% and 18% by weight vinyl acetate, a melt index between about 0.1 and about 1.0, and at least about 10 grams/1000 ft.$^2$ of starch particles with said starch particles also being present in quantity and particle size within the inner layer being contiguously associated with and substantially uniformly distributed across the inside surface of said inner layer with a portion of said starch particles are visually protruding but not physically penetrating relationship so that said inside surface is randomly uneven, at least the distributed starch-containing ethylene vinyl acetate inner layer being irradiated at dosage of at least about 2 MR; and an ethylene vinyl acetate outer layer on the opposite side of said barrier layer having between about 3% and 18% by weight vinyl acetate and a melt index between about 0.1 and about 1.0.

* * * * *